(12) United States Patent
Li

(10) Patent No.: US 12,448,089 B2
(45) Date of Patent: Oct. 21, 2025

(54) TOP-LOCK PULL-OUT TYPE CONNECTING DEVICE AND IMMERSED TUBE CONSTRUCTION SHIP

(71) Applicant: CCCC FIRST HARBOR ENGINEERING CO., LTD., Tianjin (CN)

(72) Inventor: Zengjun Li, Tianjin (CN)

(73) Assignee: CCCC FIRST HARBOR ENGINEERING CO., LTD., Tianjin (CN)

( * ) Notice: Subject to any disclaimer, the term of this patent is extended or adjusted under 35 U.S.C. 154(b) by 105 days.

(21) Appl. No.: 18/584,813

(22) Filed: Feb. 22, 2024

(65) Prior Publication Data

US 2024/0190541 A1 Jun. 13, 2024

Related U.S. Application Data

(63) Continuation of application No. PCT/CN2023/116440, filed on Sep. 1, 2023.

(30) Foreign Application Priority Data

Sep. 13, 2022 (CN) .......................... 202211106676.X

(51) Int. Cl.
 *B63B 35/00* (2020.01)
 *B63B 35/03* (2006.01)
 *F16L 1/20* (2006.01)

(52) U.S. Cl.
 CPC .............. *B63B 35/03* (2013.01); *F16L 1/207* (2013.01)

(58) Field of Classification Search
 CPC ....... B63B 35/03; B63B 35/003; B63B 77/00; E02B 2017/0047; F16L 1/207
 See application file for complete search history.

(56) References Cited

U.S. PATENT DOCUMENTS 5,607,260 A * 3/1997 Khachaturian ......... B63B 77/00
 405/209
5,800,093 A * 9/1998 Khachaturian ....... B63B 35/003
 405/209

(Continued)

FOREIGN PATENT DOCUMENTS

CN 206456509 U 9/2017
CN 108791008 A 11/2018

(Continued)

OTHER PUBLICATIONS

International Search Report for PCT/CN2023/116440.
Search Report of the priority application CN202211106676.X.

*Primary Examiner* — Benjamin F Fiorello
(74) *Attorney, Agent, or Firm* — J.C. PATENTS

(57) ABSTRACT

The present application provides a top-lock pull-out type connecting device and an immersed tube construction ship; the connecting device comprising a support member, fixedly connected to the load-bearing element and located on a side of the load-bearing element facing the borne element; a sliding member, been able to slide relative to the load-bearing element in a connection direction of the load-bearing and borne elements; an ejector rod, used to push the sliding member, fixedly connected to the borne element; a first locking member, used to lock the ejector rod, movably connected between an end of the sliding member close to the borne element and the support member, and can to be driven by the sliding member to be close to or away from the ejector rod; and a second locking member, used to lock the sliding member, and connected between an end of the sliding member away from the borne element and the load-bearing element.

17 Claims, 7 Drawing Sheets

(56) References Cited

U.S. PATENT DOCUMENTS

| | | | | |
|---|---|---|---|---|
| 6,612,781 | B1* | 9/2003 | Jackson | E02B 17/021 |
| | | | | 405/209 |
| 8,708,604 | B2* | 4/2014 | Luo | B63B 35/003 |
| | | | | 405/196 |
| 10,836,459 | B2* | 11/2020 | Li | B63B 1/107 |
| 2010/0104370 | A1* | 4/2010 | van Egmond | F16L 1/207 |
| | | | | 405/154.1 |
| 2015/0240439 | A1* | 8/2015 | Lee | E02B 17/021 |
| | | | | 405/195.1 |
| 2019/0071830 | A1* | 3/2019 | Lindblade | E02B 17/024 |

FOREIGN PATENT DOCUMENTS

| | | |
|---|---|---|
| CN | 110629919 A | 12/2019 |
| CN | 110667453 A | 1/2020 |
| CN | 110877666 A | 3/2020 |
| CN | 113148028 A | 7/2021 |
| CN | 115182386 A | 10/2022 |
| GB | 733989 A | 7/1955 |
| JP | H10244882 A | 9/1998 |

\* cited by examiner

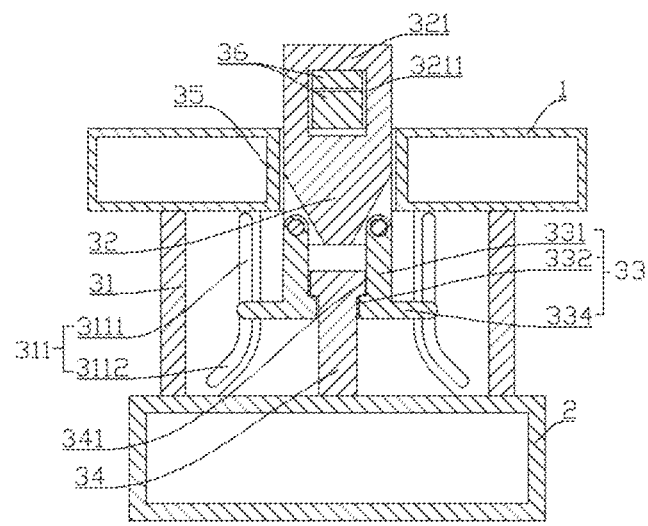
FIG. 4
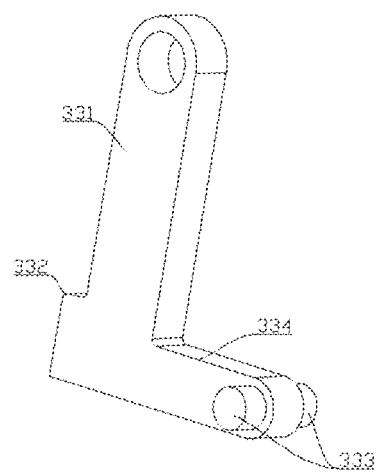
FIG. 5
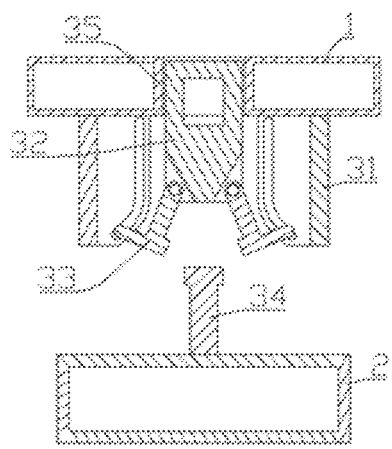 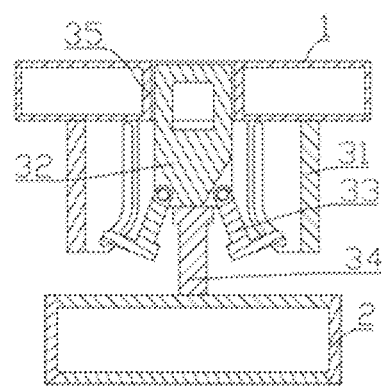
FIG. 6(a)　　　　　　FIG. 6(b)

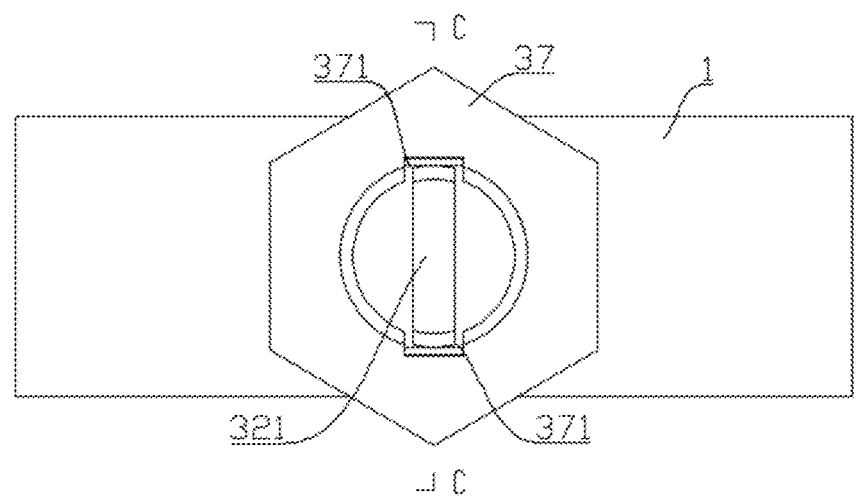
FIG. 13
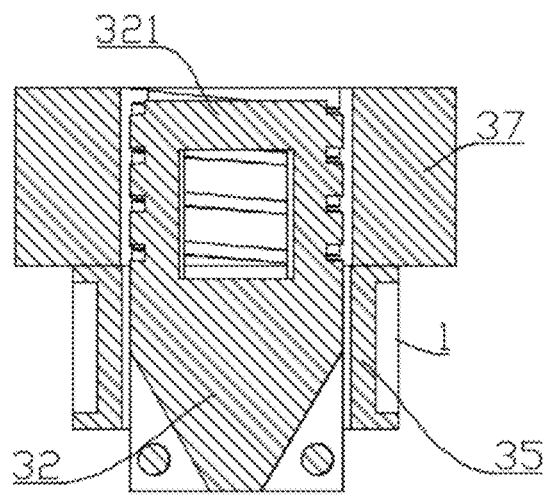
FIG. 14
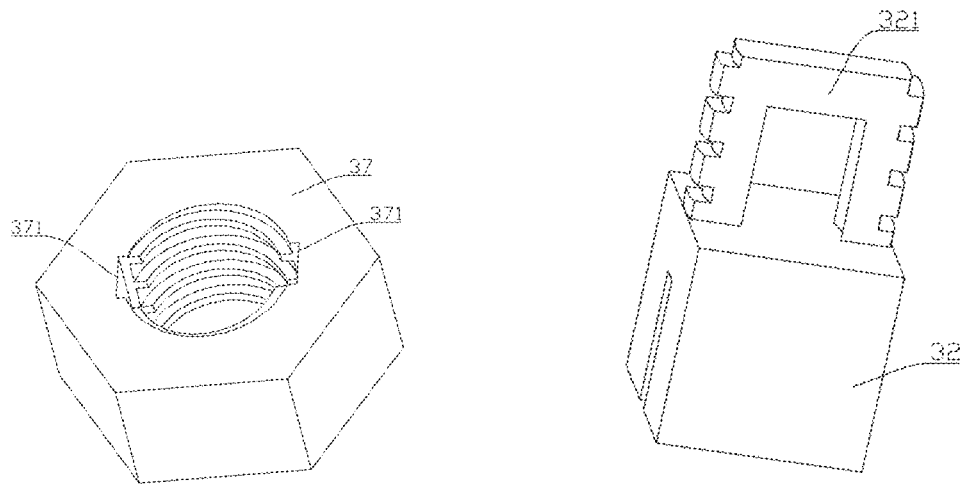
FIG. 15
FIG. 16

TOP-LOCK PULL-OUT TYPE CONNECTING DEVICE AND IMMERSED TUBE CONSTRUCTION SHIP

The present application is a continuation of the international application PCT/CN2023/116440 filed on Sep. 1, 2023, which claims the priority benefit of Chinese application No. 202211106676.X, filed on Sep. 13, 2022, entitled "top-lock pull-out type connecting device and an immersed tube construction ship containing the same", the entirety of the above identified applications is hereby incorporated by reference.

TECHNICAL FIELD

The present application belongs to the technical field of construction equipment of building engineering, and in particular to a top-lock pull-out type connecting device and an immersed tube construction ship.

BACKGROUND ART

In the construction engineering field, in order to ensure construction safety, improve construction efficiency, and reduce labor intensity, reliable connection function and convenient disconnection function between construction equipment or between construction equipment and building components are necessary functions for many construction equipment. Under certain working conditions, it is also necessary to establish a connection form between the load-bearing element and the borne element that has both pushing and pulling functions to achieve a so-called "jacked and tensioned" rigid connection.

During the floating transportation of prefabricated immersed tube sections in an immersed tube tunnel, the connection between an immersed tube and a transport ship is an example of "jacked and tensioned" rigid connection. At present, the conventional ship-tube connection structure usually adopts support piers and cables to realize the "jacked and tensioned" connection between the immersed tube and the transport ship. However, the cables need to be assembled or disassembled manually with large number; the existing conventional ship-tube connection structures do not have a convenient unlocking function, and the labor intensity is high during construction, and it is impossible to realize danger avoidance through rapid separation in an emergency situation.

SUMMARY OF THE INVENTION

In order to solve some of the problems in the prior art, the present application provides a top-lock pull-out type connecting device and an immersed tube construction ship containing the same, which is able to well realize the ship-tube connection.

A first aspect of the present application provides the top-lock pull-out type connecting device, which is connected between a load-bearing element and a borne element, including:
  a support member, fixedly connected to the load-bearing element and located on a first side of the load-bearing element facing the borne element;
  a sliding member, been able to slide relative to the load-bearing element in a connection direction of the load-bearing element and the borne element;
  an ejector rod, used to push the sliding member, fixedly connected to the borne element, located on a first side of the borne element facing the load-bearing element, and arranged opposite with the sliding member;
  a first locking member, used to lock the ejector rod, movably connected between a first end of the sliding member close to the borne element and the support member, and been able to be driven by the sliding member to be close to or away from the ejector rod; and
  a second locking member, used to lock the sliding member, and connected between a second end of the sliding member away from the borne element and the load-bearing element;
  wherein the top-lock pull-out type connecting device is configured as: when the borne element and the load-bearing element move towards each other in the connection direction, the ejector rod pushes the sliding member to slide in a direction away from the borne element, and the sliding member drives the first locking member to move close to the ejector rod; after the borne element moves to resist against the support member, the sliding member is locked and connected to the load-bearing element through the second locking member, and at this time, the first locking member matches with the ejector rod to lock the ejector rod; and after the locking of the second locking member to the sliding member is released, as the borne element and the load-bearing element move away from each other in the connection direction, the sliding member slides in a direction close to the borne element due to pulling force of the first locking member and the ejector rod, and the first locking member moves away from the ejector rod to release the ejector rod.

In some examples, there are multiple (two or more) support members, and the multiple support members are evenly distributed about the sliding member; there are multiple first locking members, and the first locking members are arranged in one-to-one correspondence with the support members; and, during locking the ejector rod, the multiple first locking members jointly clamp the ejector rod to lock the ejector rod.

In some examples, a flange is provided at a first end of the ejector rod away from the borne element; each of the first locking member is a locking arm, a first end of the locking arm is hinged with the sliding member and a second end of the locking arm is slidingly connected with the support member, and a convex edge used for clamping the flange is provided on a side of the locking arm adjacent to the ejector rod; and, the top-lock pull-out type connecting device is configured as: when the sliding member slides in the direction away from the borne element, the connecting end of the locking arm and the support member (i.e., the second end of the locking arm) slides in a direction close to the ejector rod to drive the convex edge to move close to the ejector rod and clamp the flange; and, when the sliding member slides in the direction close to the borne element, the connecting end of the locking arm and the support member (i.e., the second end of the locking arm) slides in a direction away from the ejector rod to drive the convex edge to move away from the ejector rod and release the ejector rod.

In some examples, each of the support members is provided with a sliding groove; the sliding groove comprises a straight section and an arc section connected successively; wherein the straight section is arranged in a sliding direction of the sliding member and extends from a first end of the straight section close to the load-bearing element to a second end of the straight section close to the borne element; a first end of the arc section is connected to the second end of the straight section, and the arc section is bent in a direct towards the borne element and away from the ejector rod; and, each of the locking arms includes a convex edge, and a first connecting arm and a second connecting arm connected perpendicularly to each other; wherein a first end of the first connecting arm is hinged with the sliding member, the convex edge is connected to a side of a second end of the first connecting arm adjacent to the ejector rod; a first end of the second connecting arm is slidingly connected to the sliding groove by a slider, and a second end of the second connecting arm is perpendicularly connected to an end of the first connecting arm away from the sliding member (i.e., the second end of the first connecting arm) and located at a side away from the convex edge.

In some examples, the ejector rod is cylindrical, configured to be able to come into contact with the sliding member to push the sliding member; and, there are at least three support members.

In some examples, the top-lock pull-out type connecting device further comprises a guide tube fixedly mounted on the load-bearing element; the guide tube is arranged in the sliding direction of the sliding member and runs through the load-bearing element, and the sliding member is slidingly fitted in the guide tube; and, when the second locking member locks the sliding member, the second locking member is connected with the second end of the sliding member and clamped at a penetration port of the guide tube on a second side of the load-bearing element away from the borne element.

In some examples, the second end of the sliding member is a handle portion, provided with a through groove for allowing the second locking member to be inserted therein; an extension direction of the through groove is perpendicular to the sliding direction of the sliding member; the size of the second locking member is greater than the size of the penetration port; and, when the second locking member locks the sliding member, the handle portion runs through the penetration port, and the second locking member is inserted into the through groove and clamped at the penetration port.

In some examples, the second locking member is two wedge blocks, inclined planes of the two wedge blocks are oppositely arranged and are able to slide relative to each other, and the size of at least one wedge block is greater than the size of the penetration port.

In some examples, the second locking member is a nut, an axis direction of the nut is consistent with the sliding direction of the sliding member; the size of the nut is greater than the size of the penetration port; and, the second end of the sliding member is a handle portion, provided with external threads thereon to match with the nut.

In some examples, a slideway running through the nut in the sliding direction of the sliding member is respectively formed on two opposite sides of an inner circumference of the nut; a width of the handle portion is less than a width of the two slideways; the external threads are arranged on outer walls of two ends of the handle portion in a length direction; and, when the nut is rotated until the two slideways are aligned with the two ends of the handle portion in the length direction, the handle portion is slidingly fitted between the two slideways.

A second aspect of the present application provides an immersed tube construction ship used for transporting or sinking an immersed tube, including a first floating body and a second floating body arranged substantially in parallel, and a deck bridge connected between the first floating body and the second floating body; wherein a plurality of the top-lock pull-off type connecting devices described in any one of the above examples are distributed on the deck bridge to connect different parts of the immersed tube; and, the deck bridge acts as the load-bearing element, and the immersed tube acts as the borne element.

Compared with the prior art, the present application has the following advantages and positive effects.

1. In the top-lock pull-off type connecting device provided in at least one embodiment of the present application, by means of the pushing action when the load-bearing element and the borne element move towards each other, the ejector rod arranged on the borne element is allowed to push the sliding member, and the first locking member is driven to lock the ejector rod by the sliding of the sliding member relative to the load-bearing element, so that the "tensioning" between the load-bearing element and the borne element is realized in combination with the locking of the second locking member to the sliding member. Meanwhile, the movement of the load-bearing element and the borne element towards each other is limited by the support member fixed on the load-bearing element to prevent the load-bearing element from colliding with the borne element, so as to realize the "jacking" therebetween. When it is needed to release the borne element, by releasing the locking of the second locking member to the sliding member, the pulling action when the load-bearing element and the borne element move away from each other is adopted, the sliding member slides relative to the load-bearing element, so that the first locking member moves away from the ejector rod to release the borne element.

2. The top-lock pull-off type connecting device provided in at least one embodiment of the present application also has a "jacked and tensioned" rigid connection function and a convenient unlocking function, and can satisfy the construction requirements for ship-tube connection in the immersed tube tunnel construction process, or satisfy the convenient unlocking requirements of "jacked and tensioned" rigid connection structures under other operating conditions.

3. In the top-lock pull-off type connecting device provided in at least one embodiment of the present application, locking and unlocking are completely controlled by the second locking member, without additionally providing any unlocking control mechanism. Thus, the operating mechanism of the connecting device is greatly simplified, the possibility of accidental disconnection caused by the failure of the unlocking control mechanism is fundamentally eliminated, hidden dangers are completely eliminated, and the safety is essentially realized.

BRIEF DESCRIPTION OF THE DRAWINGS

FIG. 4 is a cross-sectional view along line A-A in FIG. 3;

FIG. 5 is a schematic structural diagram of a locking arm of the top-lock pull-out type connecting device in an embodiment;

FIGS. 6(a)-6(g) are schematic diagrams of connection and release process between a load-bearing element and a borne element of the top-lock pull-out type connecting device of the present application; wherein, FIG. 6(a)-(e) are the connection process, and FIG. 6 (e)-(g) are the release process;

FIG. 13 is a top view of FIG. 12;

FIG. 14 is a cross-sectional view along line C-C in FIG. 13;

FIG. 15 is a schematic structural diagram of the second locking member of the top-lock pull-out type connecting device of the present application;

FIG. 16 is a schematic structural diagram of the sliding member of the top-lock pull-out type connecting device of the present application;

wherein, 1 load-bearing element; 2 borne element; 3 top-lock pull-out type connecting device; 4 first floating body; 5 second floating body; 6 deck bridge; 7 immersed tube; 31 support member; 311 sliding groove; 3111 straight section; 3112 arc section; 32 sliding member; 321 handle portion; 3211 through groove; 33 locking arm; 331 first connecting arm; 332 convex edge; 333 slider; 334 second connecting arm; 34 ejector rod; 341 flange; 35 guide tube; 351 penetration port; 36 wedge block; 37 nut; and, 371 slideway.

DETAILED DESCRIPTION OF THE EMBODIMENTS

The technical solutions of the present application will be described in detail below in combination with specific embodiments. However, it should be understood that elements, members, structures and features in one embodiment may also be advantageously incorporated into other embodiments without further description.

In the description of the present application, it should be noted that terms such as "first" and "second" are used for descriptive purposes only, and cannot be understood as indicating or implying the relative importance, or implicitly indicating the number of indicated technical features. Therefore, the features defined with "first" and "second" may explicitly or implicitly include one or more of these features.

Figure 1:
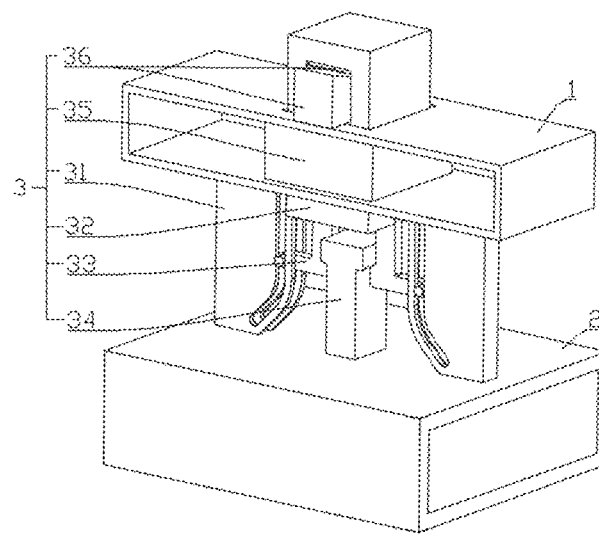
FIG. 1 is a perspective view of a top-lock pull-out type connecting device according to an embodiment.

In the description of the present application, it should be noted that the terms "up", "down", "bottom", "inner" and the like indicate an orientation or positional relationship based on the orientation or positional relationship shown in FIG. 1, merely for the convenience of describing the present application and the simplified description, but do not indicate or imply a devices or an element referred to must be of a particular orientation, constructed and operated in a particular orientation and therefore should not be construed as limiting the present application.

In the description of the present application, it should be noted that the terms "connect", "connecting" and "connected" should be understood in a broad sense unless otherwise clearly specified and limited. For example, they might be fixed connection, detachable connection, or integrated connection; might be direct connection or indirect connection through an intermediate medium, and might be internal connection of two elements. For those of ordinary skill in the art, the specific meanings of the above-mentioned terms in the present application can be understood under specific circumstances.

As shown in FIGS. 1-6, a first embodiment of the present application provides a top-lock pull-out type connecting device 3 (called a connecting device for short hereinafter), which is connected between a load-bearing element 1 and a borne element 3 and includes a support member 31, a sliding member 32, an ejector rod 34, a first locking member and a second locking member. The support member 31 is fixedly connected to the load-bearing element 1 and located on a first side of the load-bearing element 1 facing the borne element 2. For example, the support member 31 may be directly cast on the load-bearing element 1, or may be fixedly connected to the load-bearing element 1 through connecting members such as bolts. The sliding member 32 is able to slide relative to the load-bearing element 1 along a connection direction of the load-bearing element 1 and the borne element 2. The ejector rod 34 is used to push the sliding member 32, is fixedly connected to the borne element 2, is located on a first side of the borne element 2 facing the load-bearing element 1, and is arranged opposite to the sliding member 32. Specifically, the ejector rod 34 is configured to be able to contact with the sliding member 32 to push the sliding member 32. For example, the ejector rod 34 may be directly cast on the borne element 2, or may be fixedly connected to the borne element 2 through a connecting member such as a bolt. The first locking member is used to lock the ejector rod 34, is movably connected between a first end of the sliding member 32 adjacent to the borne element 2 and the support member 3, and is able to be driven by the sliding member 32 to be close to or away from the ejector rod 34. The second locking member is used to lock the sliding member 32 and is connected between a second end of the sliding member 32 away from the borne element 2 and the load-bearing element 1. When the borne element 2 and the load-bearing element 1 move towards each other in the connection direction thereof, the ejector rod 34 pushes the sliding member 32 to slide in a direction away from the borne element 2, and the sliding member 32 drives the first locking member to move close to the ejector rod 34; after the borne element 2 moves to resist against the support member 31, the sliding member 32 is locked and connected to the load-bearing element 1 through the second locking member, and at this time, the first locking member cooperates with the ejector rod 34 to lock the ejector rod 34; and, after the locking of the second locking member 32 to the sliding member is released, as the borne element 2 and the load-bearing element 1 move away from each other in the connection direction thereof, the sliding member 32 slides in a direction close to the borne element 2 due to the pulling force of the first locking member and the ejector rod 34, and the first locking member moves away from the ejector rod 34 to release the ejector rod 34.

In the connecting device 3, by means of the pushing action when the load-bearing element 1 and the borne element 2 move towards each other, the ejector rod 34 arranged on the borne element 2 is allowed to push the sliding member 32, and the first locking member is driven to lock the ejector rod 34 by the sliding of the sliding member 32 relative to the load-bearing element 1, so that the "tensioning" between the load-bearing element 1 and the borne element 2 is realized in combination with the locking of the second locking member to the sliding member 32. Meanwhile, the movement of the load-bearing element 1 and the borne element 2 towards each other is limited by the support member 31 fixed on the load-bearing element 1 to prevent the load-bearing element 1 from colliding with the borne element 2, so as to realize the "jacking" between the load-bearing element 1 and the borne element 2. When it is necessary to release the borne element 2, by unlocking the sliding member 32 from the second locking member and by the pulling action when the load-bearing element 1 and the borne element 2 move away from each other, the sliding member 32 slides relative to the load-bearing element 1, so that the first locking member move away from the ejector rod 34 so as to release the borne element 2. The connecting device 3 has a "jacked and tensioned" rigid connection function and a convenient unlocking function at the same time, which can satisfy the construction requirements for ship-tube connection in the immersed tube tunnel construction process, or satisfy the convenient unlocking requirements of "jacked and tensioned" rigid connection structures under other operating conditions. In addition, in the connecting device 3, locking and unlocking are completely controlled by the second locking member, without additionally providing any unlocking control mechanism; thus, the operating mechanism of the connecting device is greatly simplified, the possibility of accidental disconnection caused by the failure of the unlocking control mechanism is fundamentally eliminated, hidden dangers are completely eliminated, and the safety is essentially realized.

Figure 2:
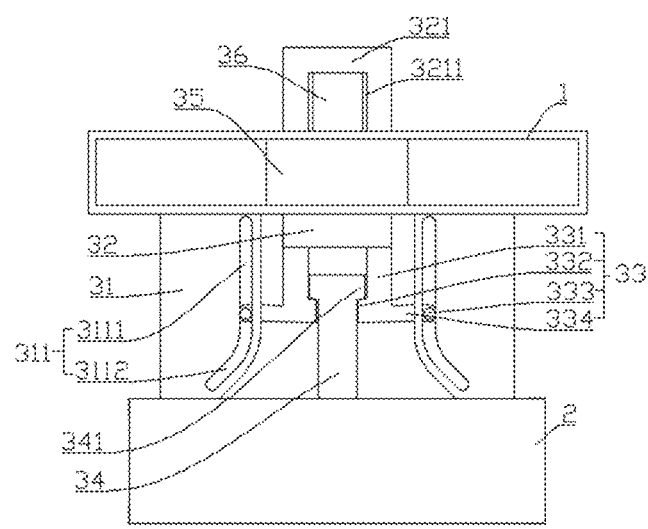
FIG. 2 is a front view of the top-lock pull-out type connecting device.

As shown in FIG. 2, in some embodiments, there are two support members 31, which are symmetrically distributed relative to the sliding member 32. There are also two first locking members, and the first locking members are arranged in one-to-one correspondence to the support members 31. During locking the ejector rod 34, the two first locking members jointly clamp the ejector rod 34 to lock the ejector rod 34. With such an arrangement, the structural stability is good, and it is advantageous to improve the bearing capability of the connecting device.

As shown in FIGS. 4-6, in one embodiment, a flange 341 is provided at a first end of the ejector rod 34 away from the borne element 2. Each first locking member is a locking arm 33, a first end of which is hinged to the sliding member 32 and a second end of is slidingly connected to the support member 31, so that the first locking member is movably connected between the first end of the sliding member 32 and the support member 31. Convex edge 332 used for clamping the flange 341 of the ejector rod is provided on a side of the locking arm 33 adjacent to the ejector rod 34. When the sliding member 32 slides in the direction away from the borne element 2, the connecting end of the locking arm 33 and the support member 31 (i.e., the second end of the locking arm) slides in a direction close to the ejector rod 34 to drive the convex edge 332 to move close to the ejector rod 34 and clamp the flange 341; and, when the sliding member 32 slides in the direction close to the borne element 2, the connecting end of the locking arm 33 and the support member 31 (i.e., the second end of the locking arm) slides in a direction away from the ejector rod 34 to drive the convex edge 332 to move away from the ejector rod 34 and release the ejector rod 34. In the present embodiment, the ejector rod 34 is locked by using the locking arm 33 as the first locking member and cooperating the convex edge 332 arranged on each locking arm 33 with the flange 341 arranged on the ejector rod 34. Meanwhile, the first end of the locking arm 33 is hinged with the sliding member 32, and the second end thereof is slidingly connected with the support member 31, so that the locking arm 33 can be opened or closed during the sliding of the sliding member 32, so as to allow the convex edge 332 to move close to or away from the ejector rod 34.

In order to drive the convex edge 332 of each locking arm 33 to move close to or away from the ejector rod 34 by the sliding of the sliding member 32, more specifically, as shown in FIGS. 4-8, each support member 31 is provided with a sliding groove 311, and the sliding groove 332 includes a straight section 3111 and an arc section 3112 connected successively. The straight section 3111 is arranged along the sliding direction of the sliding member 32, and extends from a first end of the straight section close to the load-bearing element 1 to a second end of the straight section close to the borne element 2; a first end of the arc section 3112 is connected with the second end of the straight section 3111, and the arc section 3112 is bent in a direct towards the borne element 2 and away from the ejector rod 34. As shown in FIG. 5, as the first locking member, each locking arm 33 includes the convex edge 332, and a first connecting arm 331 and a second connecting arm 334 connected perpendicularly to each other. A first end of the first connecting arm 331 is hinged to the sliding member 32, the convex edge 332 is connected to a second end of the first connecting arm 331 at a side adjacent to the ejector rod 34; a first end of the second connecting arm 334 is slidingly connected to the sliding groove 311 through a slider 333, and a second end of the second connecting arm 334 is perpendicularly connected to an end of the first connecting arm 331 away from the sliding member 32 (i.e., the second end of the first connecting arm 331) and located at a side away from the convex edge 332. With such an arrangement, as shown in FIGS. 6(a)-(g), when the sliding member 32 is not locked, the slider 333 of the locking arm 33 is located at a tail end of the arc section 3112 of the sliding groove 311; when the sliding member 32 is pushed by the ejector rod 34 to slide in the direction away from the borne element 2, the slider 333 sides along the arc section 3112, and moves in the direction close to the load-bearing element 1 and the ejector rod 34, and further the slider 333 drives the first connecting arm 331 to sway in the direction close to the ejector rod 34 through the second connecting arm 3334, so that the convex edge 332 moves close to the ejector rod 34 to be clamped with the flange 341 of the ejector rod 34; when the slider 333 slides to the junction of the arc section 3112 with the straight section 3111, the convex edge 332 is almost attached to the ejector rod 34; and, as the sliding member 32 continuously slides in the direction away from the borne element 2, the slider 333 slides along the straight section 3111, and drives the first connecting arm 331 to slide along the straight section in the direction away from the borne element 2; and the convex edge 332 is clamped on the flange 341 at the end of the ejector rod 34, thereby locking the ejector rod 34. When the borne element 2 is to be released, the sliding member 32 slides in the direction close to the borne element 2 and thus drives the slider 333 to slide along the straight section 3111 of the sliding groove 311 in the direction close to the borne element 2 through the first connecting arm 331 and the second connecting arm 334; and, when the slider 333 slides to the arc section 3112, the slider 33 drives the first connecting arm 331 to sway in the direction away from the ejector rod 34 through the second connecting arm 334, so that the convex edge 332 moves away from the ejector rod 34 to release the ejector rod 34. It is to be noted that, in the present embodiment, the convex edge 332, the first connecting arm 331, the second connecting arm 334 and the slider 333 may be formed integrally.

Figure 3:
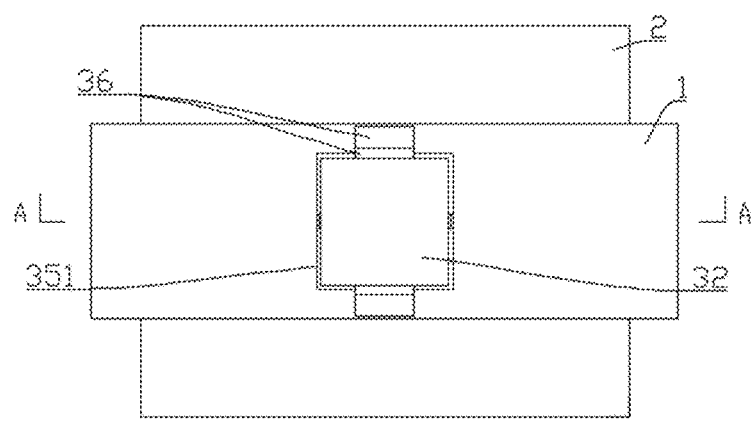
FIG. 3 is a top view of the top-lock pull-out type connecting device.

As shown in FIGS. 1-3, the connecting device 3 may further include a guide tube 35 fixedly mounted on the load-bearing element 1. The guide tube 35 is arranged in the sliding direction of the sliding member 32 and runs through the load-bearing element 1; and the sliding member 32 is slidingly fitted in the guide tube 35. When the second locking member locks the sliding member 32, the second locking member is connected to the second end of the sliding member 32 and is clamped at a penetration port 351 of the guide tube 35 on a second side of the load-bearing element 1 away from the borne element 2. The sliding direction of the sliding member 32 is guided by the provided guide tube 35, and the guide tube 35 penetrates to the second side of the load-bearing element 1, so that the second locking member can be operated on the second side of the load-bearing element 1 to lock the sliding member 32; and, when locking the sliding member 32, the second locking member is clamped at the penetration port 351 of the guide tube 35 on the second side of the load-bearing element 1, so that the locking firmness can be ensured and there is no risk of accidental disconnection.

As shown in FIGS. 3 and 4, in an embodiment, the end of the sliding member 32 away from the borne element 2 (i.e., the second end of the sliding member 32) is a handle portion 321, a through groove 3211 for allowing the second locking member to be inserted therein is formed on the handle portion 321, and an extension direction of the through groove 3211 is perpendicular to the sliding direction of the sliding member 32. The size of the second locking member is greater than the size of the penetration port 351. When the second locking member locks the sliding member 32, the handle portion 321 runs through the penetration port 351, and the second locking member is inserted into the through groove 3211 and clamped at the penetration port 351. During locking the sliding member 32, a pre-tightening force can be applied between the load-bearing element 1 and the borne element 2 by lifting the handle portion 321; and in combination with the support members 31, the "jacked and tensioned" connection effect can be ensured. Moreover, the second locking member locks the sliding member 32 by inserting the second locking member into the through groove 3211, so that it is convenient for operation.

Figure 7:
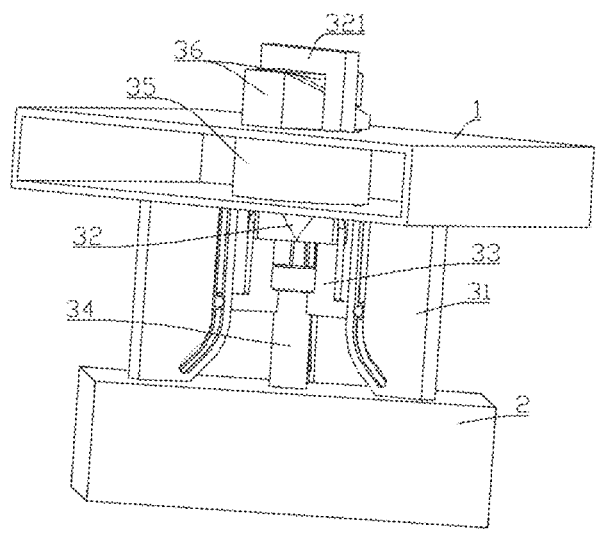
FIG. 7 is a schematic structural diagram of a top-lock pull-out type connecting device in an embodiment.

In some specific embodiments, as shown in FIGS. 1 and 7, the second locking member is two wedge blocks 36; inclined planes of the two wedge blocks 36 are oppositely arranged and are able to slide relative to each other; and the size of at least one wedge block 36 is greater than the size of the penetration port 351. According to the characteristics of the wedge blocks 36, it is determined that a large pulling force can be applied between the load-bearing element 1 and the borne element 2 by applying a small wedging force. The larger the pulling force, the larger the connection rigidity between the load-bearing element 1 and the borne element 2 under the supporting effect of the support members 31. Moreover, the wedge blocks 36 are simple in structure, convenient to assemble or disassemble, firm and reliable, and convenient for mechanical driving. It is to be noted that, when the wedge blocks 36 are inserted into the through groove 3211, the two wedge blocks 36 need to be stacked in the connection direction of the load-bearing element 1 and the borne element 2, thereby adjusting the pulling force between the load-bearing element 1 and the borne element 2 by using the relative sliding of the two wedge blocks 36. It is also to be noted that, when the wedge blocks 36 are inserted into the through groove 3211, the wedge block 36 having a size greater than that of the penetration port 351 is close to the penetration port 351.

The operating process of the connecting device 3 will be described below with reference to FIGS. 6(a)-(g).

(1) Connection process: as shown in FIGS. 6(a)-(e), the connection method using the connecting device 3 will be described below by taking the load-bearing element 1 and the borne element 2 being connected in a vertical direction as an example.

In S101, the load-bearing element 1 and the borne element 2 are moved, so that the sliding member 32 is aligned with the ejector rod 34.

In S102, as the load-bearing element 1 and the borne element 2 move towards each other in the connection direction (the vertical direction in the figures), the ejector rod 34 pushes the sliding member 32, so that the sliding member 32 slides upward in the guide tube 35 and drives each locking arm 33 to slide upward; under the coordination of the slider 333 and the arc section 3112 of the sliding groove 311, the first connecting arm 331 of each locking arm 33 sways inward at the same time; and, when each slider 333 slides to the junction of the arc section 3112 and the straight section 3111, each convex edge 332 on the inner side of the locking arm 33 moves close to the ejector rod 34, so that each convex edge 332 and the flange 341 at the end of the ejector rod 34 can reach a preset locking degree.

In S103, the two edge blocks 36 are inserted into the through groove 3211 of the sliding member 32, and the handle portion 321 of the sliding member 32 is lifted up by the relative sliding of the two wedge blocks 36 until an upper edge of the convex edge 332 of each locking arm 33 are resisted against a lower edge of the flange of the ejector rod 34. The handle portion 321 of the sliding member 32 is further lifted up by the relative sliding of the two wedge blocks 36, so that the borne element 2 is resisted against each support member 31 to achieve the predetermined "jacked and tensioned" connection state.

It is to be noted that, in the above connection process, according to the lengths of the arc section 3112 of the sliding groove 311 and the ejector rod 34, in the process of lifting up the handle portion 321 in S103, the state where the upper edge of each convex edge 332 is resisted against the lower edge of the flange 341 and the state where the borne element 2 is resisted against the support members 31 may be achieved sequentially or simultaneously. In the process of pushing the sliding member 32 by the ejector rod 34 in S102, it is possible that the borne element 2 is resisted against each support member 31 while the convex edge 332 on the inner side of each locking arm 33 is not completely attached to the ejector rod 34. At this time, the process may proceed to S103; and in the process of lifting up the handle portion 321, the convex edge 332 on the inner side of each locking arm 33 is completely attached to the ejector rod 34, and the upper edge of each convex edge 332 is resisted against the lower edge of the flange 341, thereby realizing the "jacked and tensioned" connection state. In the process of pushing the sliding member 32 by the ejector rod 34 in S102, it is also possible that the borne element 2 is resisted against each support member 31 and the upper edge of the convex edge 332 on the inner side of each locking arm 33 is resisted against the lower edge of the flange 341 at the same time; thus, in the process of lifting up the handle portion 321 in S103, it is only necessary to resist the upper edge of the convex edge 332 against the lower edge of the flange 341. Only a few possible situations are listed here, and for other situations are possible when the load-bearing element 1 and the borne element 2 are connected by the top-lock pull-out type connecting device 3, the steps in the connection method can be adjusted by those skilled in the art according to the structure of the top-lock pull-out type connecting device 3, and it will not be repeated here.

Figure 6C:
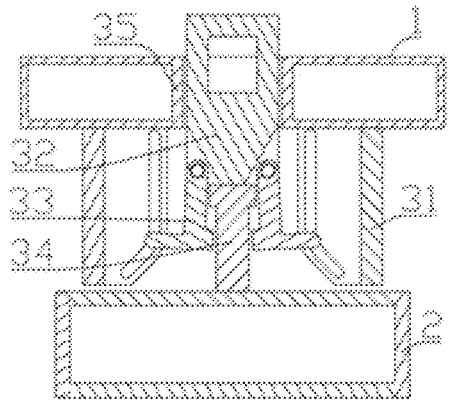
Figure 6D:
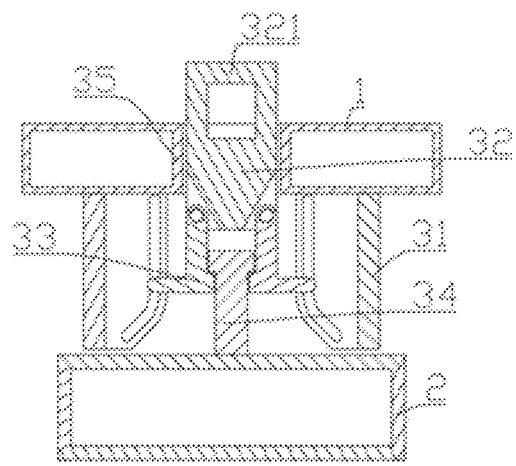
Figure 6E:
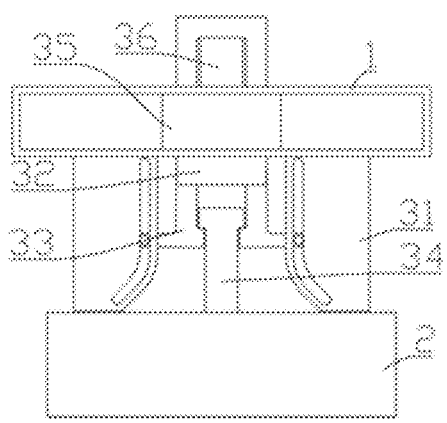
Figure 6F:
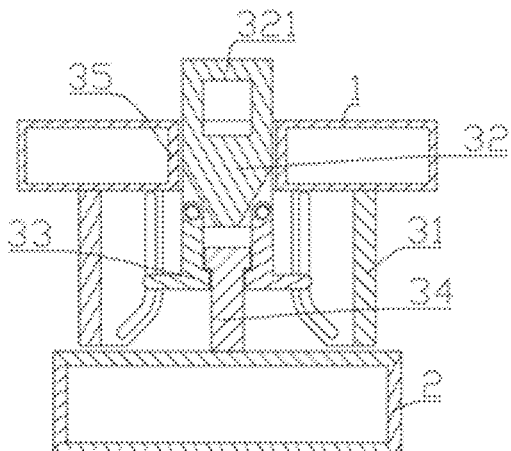
Figure 6G:
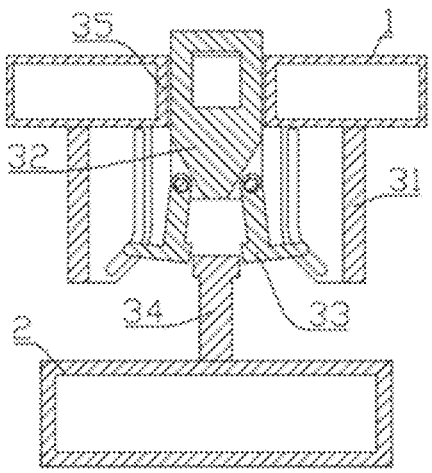

(2) Release process: as shown in FIGS. 6(e)-(g), for the load-bearing element 1 and the borne element 2 connected by the top-lock pull-out type connecting device 3, the borne element 2 is released by the following method.

In S201, the two wedge blocks 36 are slowly pulled out from the through groove 3211, and the sliding member 32 slides downward along the guide tube 35 due to the dragging action when the load-bearing element 1 and the borne element 2 move away from each other and drives each locking arm 33 to move downward.

In S202, when the slider 333 of each locking arm 33 slides to the arc section 3112 of the sliding groove 311 along the sliding groove 311, under the cooperation of the slider 333 and the arc section 3112, the first connecting arm of each locking arm 33 sways outward at the same time, so that each convex edge 332 is separated from the flange 341 to release the borne element 2.

Figure 8:
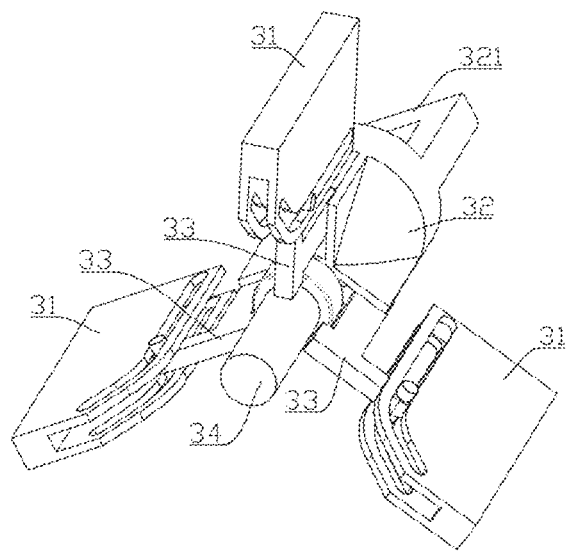
FIG. 8 is a schematic assembly diagram of support members, a sliding member, first locking members and an ejector rod.
Figure 9:
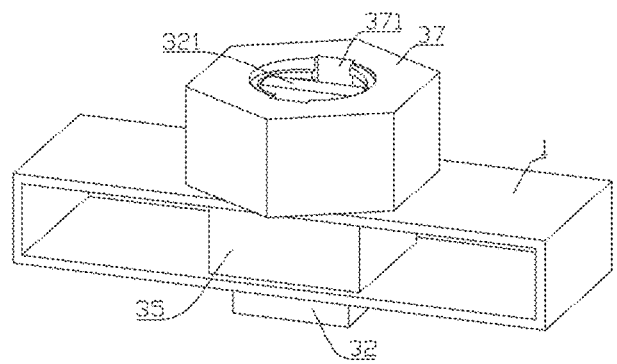
FIG. 9 is an assembly perspective view of a load-bearing element, a second locking member, and a sliding member when the sliding member of the top-lock pull-out type connecting device is in a locked state according to an embodiment.
Figure 10:
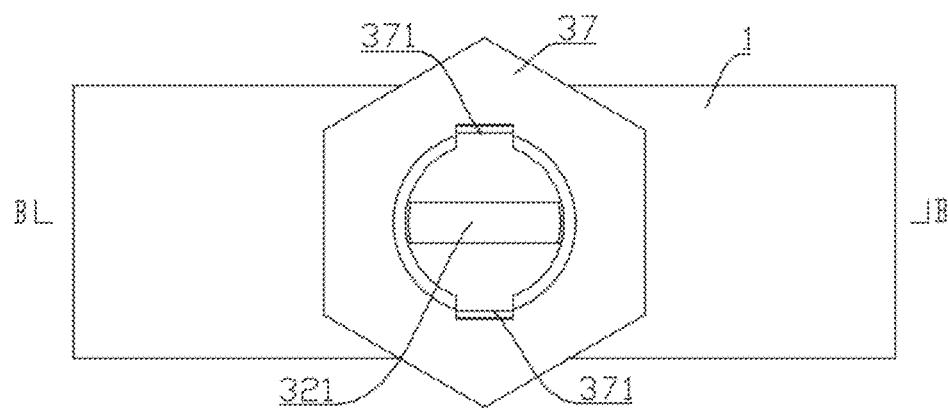
FIG. 10 is a top view of FIG. 9.
Figure 11:
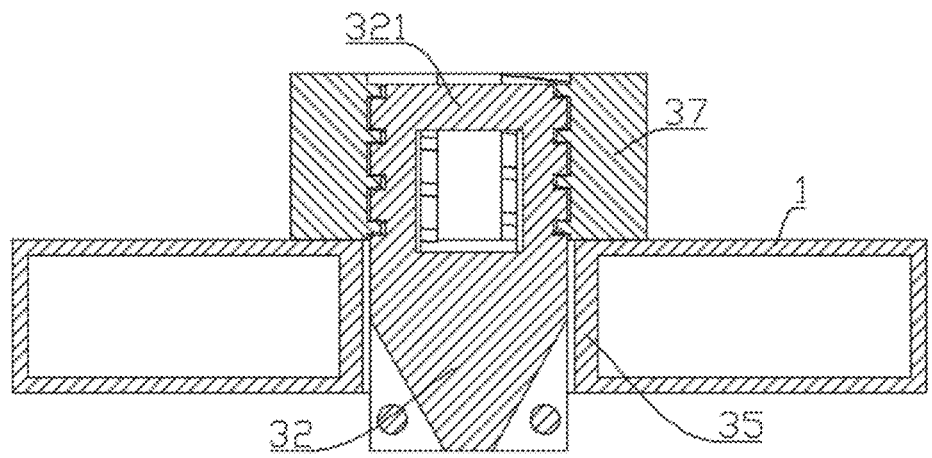
FIG. 11 is a cross-sectional view along line B-B in FIG. 10.
Figure 12:
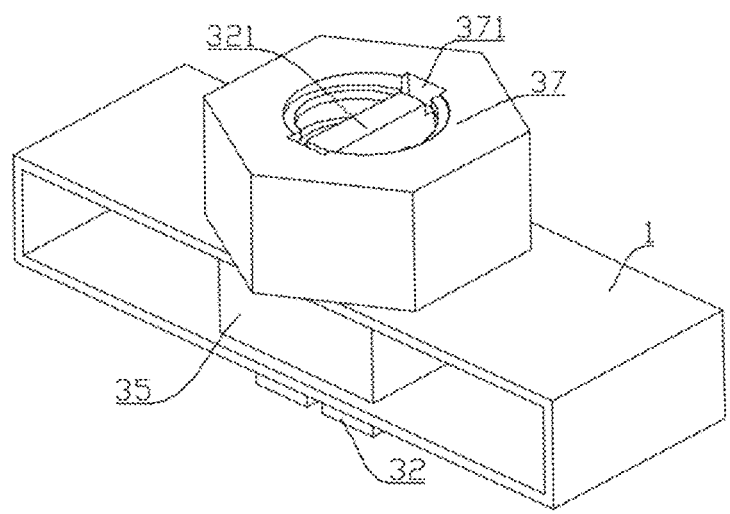
FIG. 12 is an assembly perspective view of the load-bearing element, the second locking member, and the sliding member when the sliding member of the top-lock pull-out type connecting device of the present application is in an unlocked state.

As shown in FIGS. 7 and 8, in one embodiment, the ejector rod 34 is cylindrical; there are three support members 31, which are evenly distributed about the sliding member 32; and, there are also three first locking members (i.e., locking arms 33), and the first locking members are arranged in one-to-one correspondence with the support members 31. During locking the ejector rod 34, the three first locking members jointly clamp the ejector rod 34 to lock the ejector rod 34. It should be understood that there may be more than three support members 31 and more than three first locking members. By adopting the cylindrical ejector rod 34, the rotation angle produced about the axis of the ejector rod 34 between the borne element 2 and the load-bearing element 1 can be better adapted, and it is convenient to expand the application range of the connecting device.

As shown in FIGS. 9-16, in other embodiments, the second locking member is a nut 37; an axis direction of the nut 37 is consistent with the sliding direction of the sliding member 32; the size of the nut 37 is greater than that of the penetration port 351; and the nut 37 is located on the second side of the load-bearing element 1. The second end of the sliding member 32 is a handle portion 321, provided with external threads thereon to match with the nut 37. In the present embodiment, by using a nut 37 as the second locking member, the sliding member 32 is locked through the threaded connection of the nut 37 and the sliding member 32. According to the characteristics of the threads, it is determined that a large pulling force can be applied between the load-bearing element 1 and the borne element 2 by applying a small screwing force. The larger the pulling force, the larger the connection rigidity between the load-bearing element 1 and the borne element 2 under the supporting effect of the support members 31. Moreover, the nut 37 is simple in structure, convenient to assemble or disassemble, firm and reliable, and convenient for mechanical driving. It is to be noted that, when the nut 37 is used as the second locking member, the handle portion 321 of the sliding member 32 can be lifted up by an additional lifting sling or in a manual lifting manner; and the lifting-up and tensioning can also be realized by means of the screwing action between the nut 37 and the handle portion 321.

In order to rapidly unlock the sliding member 32, as shown in FIGS. 9-16, a slideway 371 running through the nut 37 in the sliding direction of the sliding member 32 is respectively formed on two opposite sides of the inner circumferential of the nut 37; and the width of the handle portion 321 is less than the width of the slideways 371. As shown in FIG. 16, the external threads of the handle portion 321 are arranged on outer walls of two ends of the handle portion 321 in its length direction. When the nut 37 is screwed to the situation that the two slideways 317 are align with the two ends of the handle portion 321 in its length direction, the handle portion 321 is slidingly fitted between the two slideways 371, so that the sliding member 32 can slide relative to the nut 37, thereby realizing rapid unlocking.

Figure 17:
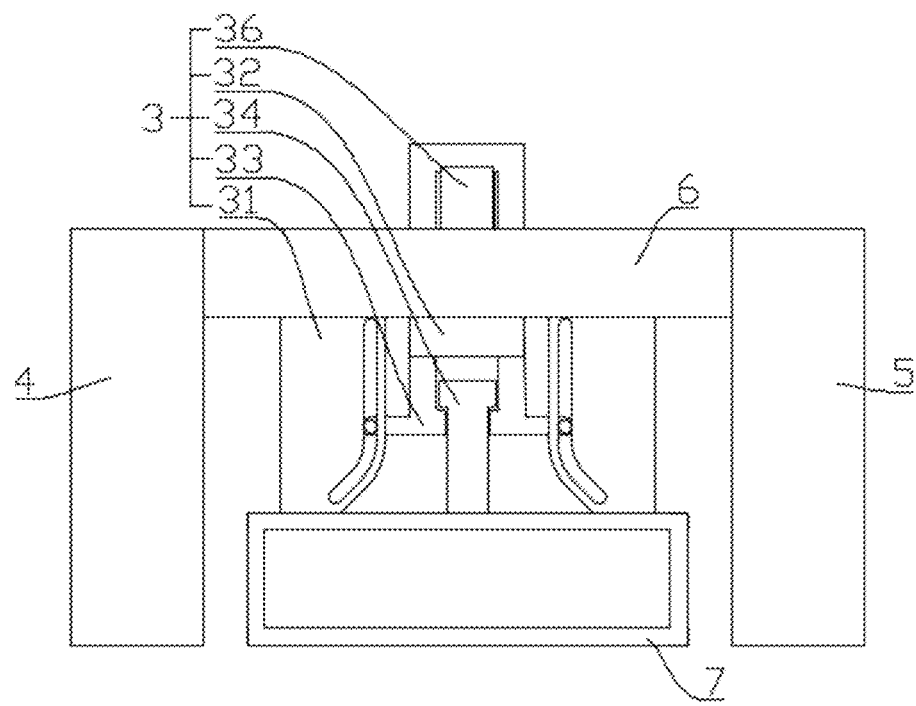
FIG. 17 is a schematic structural diagram of an immersed tube construction ship in an embodiment.
Figure 18:
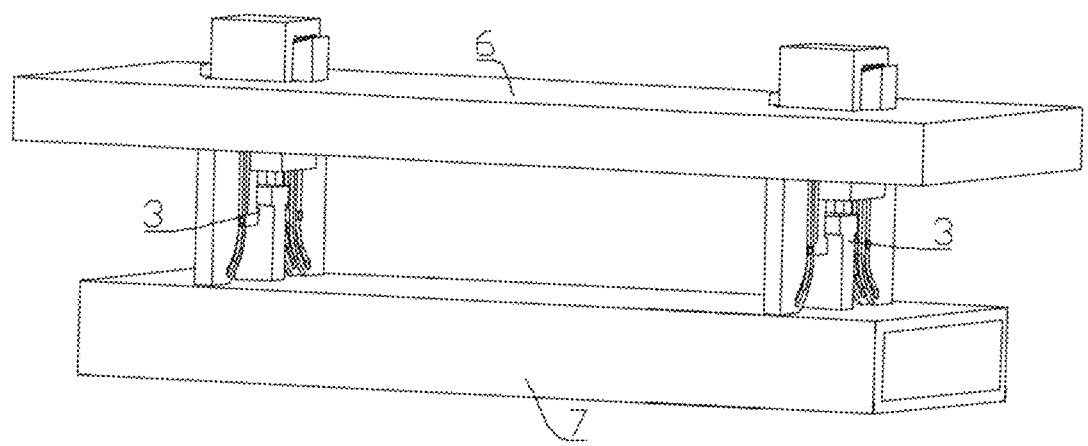
FIG. 18 is a schematic assembly diagram of a deck bridge of the immersed tube construction ship, the top-lock pull-out type connecting device and the immersed tube of the present application.

As shown in FIGS. 17 and 18, based on the above top-lock pull-out type connecting device 3, a second embodiment of the present application provides an immersed tube construction ship, used for transporting or sinking an immersed tube. The immersed tube construction ship includes a first floating body 4 and a second floating body 5 arranged in parallel, and a deck bridge 6 connected between the first floating body 4 and the second floating body 5. A plurality of the connecting devices 3 described in any one of the above embodiments are distributed on the deck bridge 6 to connect different parts of the immersed tube 7, respectively; wherein, the deck bridge 6 acts the load-bearing element, and the immersed tube 7 acts as the borne element. The immersed tube construction ship realizes ship-tube connection through the connecting device 3, can realize the "jacked and tensioned" rigid connection between the ship and the tube to ensure the construction safety, and can realize the quick release of the immersed tube 7, so that it is advantageous to realize rapid ship-tube disconnection in an emergency, improve the construction efficiency and reduce the labor intensity.

In the present embodiment, the connection direction of the load-bearing element 1 and the borne element 2, the pushing direction of the ejector rod 34, the sliding direction of the sliding member 32, the extension direction of the straight section 3111, the length direction of the handle portion 321 and the axis direction of the nut 37 are substantially parallel, and are all embodied as the vertical direction in the figures.

Finally, it should be noted that each embodiment in the description may be described in a progressive manner; each embodiment focuses on the differences from other embodiments; and the same and similar features between the various embodiments can be referred to each other. And, the embodiments are only described as preferred embodiments of the present application, and are not intended to limit the scope of the present application. Various modifications and improvements made on the technical solutions of the present application by ordinary skill in the art without departing from the design spirit of the present application shall fall within the protective scope confirmed by the claims of the present application.

The invention claimed is:

1. A top-lock pull-out type connecting device to be connected between a load-bearing element and a borne element, comprising:
   a support member, fixedly connected to the load-bearing element and located on a first side of the load-bearing element facing the borne element;
   a sliding member, being able to slide relative to the load-bearing element in a connection direction of the load-bearing element and the borne element;

an ejector rod, used to push the sliding member, fixedly connected to the borne element, located on a first side of the borne element facing the load-bearing element, and arranged opposite with the sliding member;
a first locking member, used to lock the ejector rod, movably connected between a first end of the sliding member close to the borne element and the support member, and been able to be driven by the sliding member to be close to or away from the ejector rod; and
a second locking member, used to lock the sliding member, and connected between a second end of the sliding member away from the borne element and the load-bearing element;
wherein the top-lock pull-out type connecting device is configured as: when the borne element and the load-bearing element move towards each other in the connection direction, the ejector rod pushes the sliding member to slide in a direction away from the borne element, and the sliding member drives the first locking member to move close to the ejector rod; after the borne element moves to resist against the support member, the sliding member is locked and connected to the load-bearing element through the second locking member, and at this time, the first locking member matches with the ejector rod to lock the ejector rod; and after the locking of the second locking member to the sliding member is released, as the borne element and the load-bearing element move away from each other in the connection direction, the sliding member slides in a direction close to the borne element due to pulling force of the first locking member and the ejector rod, and the first locking member moves away from the ejector rod to release the ejector rod.

2. The top-lock pull-out type connecting device according to claim 1, wherein, there are multiple support members, evenly distributed about the sliding member; there are multiple first locking members, arranged in one-to-one correspondence with the support members; and, during locking the ejector rod, the multiple first locking members jointly clamp the ejector rod to lock the ejector rod.

3. The top-lock pull-out type connecting device according to claim 2, wherein, a flange is provided at a first end of the ejector rod away from the borne element; each of the first locking member is a locking arm, with a first end hinged with the sliding member and a second end slidingly connected with the support member; a convex edge used for clamping the flange is provided on a side of the locking arm adjacent to the ejector rod; and, the top-lock pull-out type connecting device is configured as: when the sliding member slides in the direction away from the borne element, the second end of the locking arm slides in a direction close to the ejector rod to drive the convex edge to move close to the ejector rod and clamp the flange; and, when the sliding member slides in the direction close to the borne element, the second end of the locking arm slides in a direction away from the ejector rod to drive the convex edge to move away from the ejector rod and release the ejector rod.

4. The top-lock pull-out type connecting device according to claim 3, wherein, each of the support members is provided with a sliding groove; the sliding groove comprises a straight section and an arc section connected successively, with the straight section being arranged in a sliding direction of the sliding member and extending from a first end of the straight section close to the load-bearing element to a second end of the straight section close to the borne element, a first end of the arc section being connected to the second end of the straight section, and the arc section being bent in a direct towards the borne element and away from the ejector rod; and, each of the locking arms includes a convex edge, and a first connecting arm and a second connecting arm connected perpendicularly to each other, with a first end of the first connecting arm being hinged with the sliding member, the convex edge being connected to a side of a second end of the first connecting arm adjacent to the ejector rod, a first end of the second connecting arm being slidingly connected to the sliding groove by a slider, and a second end of the second connecting arm being perpendicularly connected to the second end of the first connecting arm and being located at a side away from the convex edge.

5. The top-lock pull-out type connecting device according to claim 4, wherein, the ejector rod is cylindrical, configured to be able to come into contact with the sliding member to push the sliding member; and, there are at least three support members.

6. The top-lock pull-out type connecting device according to claim 3, wherein, the ejector rod is cylindrical, configured to be able to come into contact with the sliding member to push the sliding member; and, there are at least three support members.

7. The top-lock pull-out type connecting device according to claim 3, wherein, further comprises a guide tube fixedly mounted on the load-bearing element; the guide tube is arranged in a sliding direction of the sliding member and runs through the load-bearing element, and the sliding member is slidingly fitted in the guide tube; and, when the second locking member locks the sliding member, the second locking member is connected with the second end of the sliding member and clamped at a penetration port of the guide tube on a second side of the load-bearing element away from the borne element.

8. The top-lock pull-out type connecting device according to claim 7, wherein, the second end of the sliding member is a handle portion, provided with a through groove for allowing the second locking member to be inserted therein; an extension direction of the through groove is perpendicular to the sliding direction of the sliding member; the size of the second locking member is greater than the size of the penetration port; and, when the second locking member locks the sliding member, the handle portion runs through the penetration port, and the second locking member is inserted into the through groove and clamped at the penetration port.

9. The top-lock pull-out type connecting device according to claim 8, wherein, the second locking member is two wedge blocks, inclined planes of the two wedge blocks are oppositely arranged and are able to slide relative to each other, and the size of at least one wedge block is greater than the size of the penetration port.

10. The top-lock pull-out type connecting device according to claim 7, wherein, the second locking member is a nut, an axis direction of the nut is consistent with the sliding direction of the sliding member; the size of the nut is greater than the size of the penetration port; and, the second end of the sliding member is a handle portion, provided with external threads thereon to match with the nut.

11. The top-lock pull-out type connecting device according to claim 10, wherein, a slideway running through the nut in the sliding direction of the sliding member is respectively formed on two opposite sides of an inner circumference of the nut; a width of the handle portion is less than a width of the two slideways; the external threads are arranged on outer walls of two ends of the handle portion in a length direction; and, when the nut is rotated until the two slideways are aligned with the two ends of the handle portion in the length direction, the handle portion is slidingly fitted between the two slideways.

12. The top-lock pull-out type connecting device according to claim 1, wherein, further comprises a guide tube fixedly mounted on the load-bearing element; the guide tube is arranged in a sliding direction of the sliding member and runs through the load-bearing element, and the sliding member is slidingly fitted in the guide tube; and, when the second locking member locks the sliding member, the second locking member is connected with the second end of the sliding member and clamped at a penetration port of the guide tube on a second side of the load-bearing element away from the borne element.

13. The top-lock pull-out type connecting device according to claim 12, wherein, the second end of the sliding member is a handle portion, provided with a through groove for allowing the second locking member to be inserted therein; an extension direction of the through groove is perpendicular to the sliding direction of the sliding member; the size of the second locking member is greater than the size of the penetration port; and, when the second locking member locks the sliding member, the handle portion runs through the penetration port, and the second locking member is inserted into the through groove and clamped at the penetration port.

14. The top-lock pull-out type connecting device according to claim 13, wherein, the second locking member is two wedge blocks, inclined planes of the two wedge blocks are oppositely arranged and are able to slide relative to each other, and the size of at least one wedge block is greater than the size of the penetration port.

15. The top-lock pull-out type connecting device according to claim 12, wherein, the second locking member is a nut, an axis direction of the nut is consistent with the sliding direction of the sliding member; the size of the nut is greater than the size of the penetration port; and, the second end of the sliding member is a handle portion, provided with external threads thereon to match with the nut.

16. The top-lock pull-out type connecting device according to claim 15, wherein, a slideway running through the nut in the sliding direction of the sliding member is respectively formed on two opposite sides of an inner circumference of the nut; a width of the handle portion is less than a width of the two slideways; the external threads are arranged on outer walls of two ends of the handle portion in a length direction; and, when the nut is rotated until the two slideways are aligned with the two ends of the handle portion in the length direction, the handle portion is slidingly fitted between the two slideways.

17. An immersed tube construction ship used for transporting or sinking an immersed tube, comprising a first floating body and a second floating body arranged substantially in parallel, and a deck bridge connected between the first floating body and the second floating body; wherein, a plurality of the top-lock pull-off type connecting devices according to claim 1 are distributed on the deck bridge to connect different parts of the immersed tube; and, the deck bridge acts as the load-bearing element, and the immersed tube acts as the borne element.

* * * * *